(12) United States Patent
Ai

(10) Patent No.: US 10,354,430 B2
(45) Date of Patent: Jul. 16, 2019

(54) IMAGE UPDATE METHOD, SYSTEM, AND APPARATUS

(71) Applicant: Huawei Technologies Co., Ltd., Shenzhen (CN)

(72) Inventor: Chuyue Ai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/791,055

(22) Filed: Oct. 23, 2017

(65) Prior Publication Data
US 2018/0047205 A1 Feb. 15, 2018

Related U.S. Application Data

(63) Continuation of application No. 14/980,524, filed on Dec. 28, 2015, now Pat. No. 9,830,730, which is a continuation of application No. PCT/CN2014/072057, filed on Feb. 13, 2014.

(30) Foreign Application Priority Data

Jun. 28, 2013 (CN) .......................... 2013 1 0269616

(51) Int. Cl.
G06T 15/00 (2011.01)
G06F 3/14 (2006.01)
(Continued)

(52) U.S. Cl.
CPC .......... *G06T 15/005* (2013.01); *G06F 3/1454* (2013.01); *G06F 8/65* (2013.01);
(Continued)

(58) Field of Classification Search
CPC ...... G06F 3/0662; G06F 9/4445; G06F 9/455; G06F 9/45533
See application file for complete search history.

(56) References Cited

U.S. PATENT DOCUMENTS

2007/0097130 A1 5/2007 Margulis
2009/0189890 A1 7/2009 Corbett et al.
(Continued)

FOREIGN PATENT DOCUMENTS

CN 1805354 A 7/2006
CN 101918921 A 12/2010
(Continued)

OTHER PUBLICATIONS

Machine Translation and Abstract of Chinese Publication No. CN1805354, Jul. 19, 2006, 12 pages.
(Continued)

Primary Examiner — Phi Hoang
(74) Attorney, Agent, or Firm — Conley Rose, P.C.

(57) ABSTRACT

An image update method executed by a render server, includes: acquiring a graphics instruction of a virtual machine, determining a type of the graphics instruction of the virtual machine, if the type of the graphics instruction of the virtual machine is a three-dimensional graphics instruction, sending a drawing instruction to a graphics processing unit to perform rendering processing, acquiring a rendering image corresponding to the graphics instruction of the virtual machine, sending a graphics update instruction to a primary surface management unit of the render server, acquiring an original primary surface of the virtual machine, synthesizing a new primary surface according to the original primary surface of the virtual machine, the first graphics update area, and the rendering image, sending an image corresponding to the new primary surface to a client of the virtual machine.

9 Claims, 5 Drawing Sheets

(51) Int. Cl.
  *G06F 9/50* (2006.01)
  *G06F 8/65* (2018.01)
  *G06F 9/455* (2018.01)

(52) U.S. Cl.
  CPC ........... *G06F 9/45558* (2013.01); *G06F 9/50* (2013.01); *G06F 2009/45579* (2013.01); *G09G 2370/022* (2013.01)

(56) References Cited

U.S. PATENT DOCUMENTS

| | | | |
|---|---|---|---|
| 2009/0195537 A1 | 8/2009 | Qiu et al. | |
| 2009/0300414 A1* | 12/2009 | Huang | G06F 11/2097 714/11 |
| 2011/0134111 A1* | 6/2011 | Stone | G06F 9/45541 345/419 |
| 2011/0141123 A1* | 6/2011 | Kumar | G06F 13/14 345/520 |
| 2012/0151372 A1* | 6/2012 | Kominac | G06F 17/30905 715/740 |
| 2014/0184622 A1* | 7/2014 | Xia | G06T 1/20 345/522 |
| 2014/0226901 A1* | 8/2014 | Spracklen | G06F 9/451 382/167 |

FOREIGN PATENT DOCUMENTS

| | | |
|---|---|---|
| CN | 101933041 A | 12/2010 |
| CN | 102725736 A | 10/2012 |
| CN | 103294439 A | 9/2013 |
| WO | 2011032114 A1 | 3/2011 |

OTHER PUBLICATIONS

Machine Translation and Abstract of Chinese Publication No. CN103294439, Sep. 11, 2013, 4 pages.
Foreign Communication From a Counterpart Application, European Application No. 14817265.3, Extended European Search Report dated Mar. 11, 2016, 10 pages.
Foreign Communication From a Counterpart Application, Chinese Application No. 201310269616.4, Chinese Office Action dated Aug. 3, 2015, 4 pages.
Foreign Communication From a Counterpart Application, Chinese Application No. 201310269616.4, Chinese Search Report dated Jul. 16, 2015, 2 pages.
Foreign Communication From a Counterpart Application, PCT Application No. PCT/CN2014/072057, English Translation of International Search Report dated May 19, 2014, 2 pages.
Foreign Communication From a Counterpart Application, PCT Application No. PCT/CN2014/072057, English Translation of Written Opinion dated May 19, 2014, 6 pages.

* cited by examiner

US 10,354,430 B2

IMAGE UPDATE METHOD, SYSTEM, AND APPARATUS

CROSS-REFERENCE TO RELATED APPLICATION

This application is a continuation of U.S. patent application Ser. No. 14/980,524, filed on Dec. 28, 2015, which is a continuation of International Application No. PCT/CN2014/072057, filed on Feb. 13, 2014, which claims priority to Chinese Patent Application No. 201310269616.4, filed on Jun. 28, 2013. All of the afore-mentioned patent applications are hereby incorporated by reference in their entireties.

TECHNICAL FIELD

The present disclosure relates to the field of information technologies (IT), and in particular, to an image update method, system, and apparatus.

BACKGROUND

A remote desktop is a popular technology in a current enterprise office environment and is often used to transfer content displayed on a computer screen to another computer screen for display. Generally, a more commonly used remote login program is the Windows® (an operating system) remote login program (mstsc.exe), and the remote login program allows login to another computer from a local computer.

Currently, most remote desktop systems transfer a remote desktop based on an Internet protocol (IP) network. The remote desktop not only refers to a remote screen display, but may also refer to technologies such as remote sound transfer and pluggable hardware mapping. The remote desktop may also be referred to as a virtual desktop. In a virtual desktop scenario, at least one server and at least one client exist, and a client may log in to the server by using virtual desktop client software installed on the client.

During login to a remote desktop, three-dimensional software, such as auto computer aided design software (AutoCAD®), 3Ds Max® (three-dimensional animation rendering and production software based on a personal computer (PC) system, and Pro/E® (three-dimensional graphics software), that performs graphics operation depending on a graphics processing unit (GPU) may be used. When the software runs on a virtual machine, a GPU virtualization technology may be used to enable multiple virtual machines to share one physical graphics card to perform graphics operation, so that efficiency of utilizing a hardware resource can be improved.

When a GPU is used to process an image in remote login, an approach in the prior art is:

As shown in FIG. 1, a desktop image of a virtual machine may be acquired by using an image capture interface of Direct3D (D3D), which is a display program interface. In such a technology, a two-dimensional (2D) instruction ("Two-dimensional instruction" in FIG. 1) acquired from the virtual machine needs to be reconstructed into a D3D instruction, and the D3D instruction and another three-dimensional (3D) instruction ("Three-dimensional instruction" in FIG. 1) are placed together in a GPU ("Graphics processing unit" in FIG. 1) by using the D3D interface to perform rendering. After the rendering is completed, the image capture interface ("Image capture" in FIG. 1) provided by the D3D is used to acquire a rendering result.

A disadvantage of the solution is that the solution increases complexity of reconstructing a 2D instruction into a D3D instruction, and also increases an additional GPU load.

SUMMARY

Embodiments of the present disclosure provide an image update method, system, and apparatus, which implement a technical effect that an image in a process of remote login can be simply obtained, and improve efficiency of acquiring an image.

A first aspect of the present disclosure provides an image update method, including acquiring, by a render server, a graphics instruction of a virtual machine, where the graphics instruction of the virtual machine carries a first graphics update area and graphics update content; determining, by the render server, a type of the graphics instruction of the virtual machine; if the type of the graphics instruction of the virtual machine is a three-dimensional graphics instruction, sending, by the render server, a drawing instruction to a graphics processing unit to perform rendering processing, where the drawing instruction carries the three-dimensional graphics instruction, acquiring a rendering image corresponding to the graphics instruction of the virtual machine, and sending a graphics update instruction to a primary surface management unit of the render server, where the graphics update instruction carries the rendering image and the first graphics update area; and acquiring, by the primary surface management unit, an original primary surface of the virtual machine, synthesizing a new primary surface according to the original primary surface of the virtual machine, the first graphics update area, and the rendering image, and sending an image corresponding to the new primary surface to a client of the virtual machine.

With reference to the first aspect, in a first possible implementation manner, if the graphics instruction of the virtual machine is a two-dimensional graphics instruction, sending, by the render server, a graphics update instruction to the primary surface management unit, where the graphics update instruction carries the two-dimensional graphics instruction and the first graphics update area, acquiring, by the primary surface management unit, an original primary surface of the virtual machine, synthesizing a new primary surface according to the original primary surface of the virtual machine, the first graphics update area, and the two-dimensional graphics instruction, and sending an image corresponding to the new primary surface to a client of the virtual machine.

With reference to the first aspect or the first possible implementation manner, in a second possible implementation manner, the render server acquires multiple graphics instructions of the virtual machine, and places the multiple graphics instructions of the virtual machine in an instruction queue to perform subsequent processing one by one.

With reference to the second possible implementation manner, in a third possible implementation manner, the method further includes determining, by the render server, whether an execution result of the graphics instruction of the virtual machine changes an image of a primary surface of the virtual machine, and if the execution result of the graphics instruction of the virtual machine changes an image of a primary surface of the virtual machine, allocating an execution sequence number to the graphics instruction of the virtual machine, so that the execution sequence number is carried in the graphics update instruction and is sent to the primary surface management unit, where the execution sequence number is allocated in ascending order or in descending order according to a time sequence of each graphics instruction, of the virtual machine, in the instruction queue; and correspondingly, after the primary surface management unit receives the graphics update instruction, synthesizing the new primary surface corresponding to the graphics update instruction according to the execution sequence number carried in the graphics update instruction.

With reference to the third possible implementation manner, in a fourth possible implementation manner, the synthesizing the new primary surface corresponding to the graphics update instruction according to the execution sequence number carried in the graphics update instruction includes acquiring, by the primary surface management unit, a first execution sequence number that is for execution of the synthesizing, by the primary surface management unit, a new primary surface at a previous time, and if a time sequence of the execution sequence number, carried in the graphics update instruction, in the instruction queue is not earlier than a time sequence of the first execution sequence number, synthesizing the new primary surface corresponding to the graphics update instruction according to the first graphics update area, or if a time sequence of the execution sequence number, carried in the graphics update instruction, in the instruction queue is earlier than a time sequence of the first execution sequence number, modifying the first graphics update area, and synthesizing the new primary surface corresponding to the graphics update instruction according to the modified first graphics update area.

With reference to the first aspect or the first possible implementation manner, in a fifth possible implementation manner, the drawing instruction sent by the render server to the graphics processing unit further includes a graphics moving identifier; and the method further includes acquiring, by the render server, the rendering image that is sent by the graphics processing unit according to the graphics moving identifier and corresponds to the graphics instruction of the virtual machine.

A second aspect of the present disclosure provides an image update system including an acquiring unit configured to acquire a graphics instruction of a virtual machine, where the graphics instruction of the virtual machine carries a first graphics update area and graphics update content; an instruction queue unit configured to determine a type of the graphics instruction of the virtual machine; and if the type of the graphics instruction of the virtual machine is a three-dimensional graphics instruction, send a drawing instruction to a graphics processing unit to perform rendering processing, where the drawing instruction carries the three-dimensional graphics instruction; a three-dimensional rendering unit configured to acquire a rendering image corresponding to the graphics instruction of the virtual machine, and send a graphics update instruction to a primary surface management unit, where the graphics update instruction carries the rendering image and the first graphics update area; the primary surface management unit configured to acquire an original primary surface of the virtual machine, and synthesize a new primary surface according to the original primary surface of the virtual machine, the first graphics update area, and the rendering image; and a sending unit configured to send an image corresponding to the new primary surface to a client of the virtual machine.

With reference to the second aspect, in a first possible implementation manner, the instruction queue unit is further configured to if the graphics instruction of the virtual machine is a two-dimensional graphics instruction, send a graphics update instruction to the primary surface management unit, where the graphics update instruction carries the two-dimensional graphics instruction and the first graphics update area; the primary surface management unit is further configured to acquire an original primary surface of the virtual machine, and synthesize a new primary surface according to the original primary surface of the virtual machine, the first graphics update area, and the two-dimensional graphics instruction; and the sending unit is configured to send an image corresponding to the new primary surface to a client of the virtual machine.

With reference to the second aspect or the first possible implementation manner, in a second possible implementation manner, the instruction queue unit is further configured to acquire multiple graphics instructions of the virtual machine, place the multiple graphics instructions of the virtual machine in an instruction queue to perform subsequent processing one by one.

With reference to the second possible implementation manner, in a third possible implementation manner, the instruction queue unit is further configured to determine whether an execution result of the graphics instruction of the virtual machine changes an image of a primary surface of the virtual machine, and if the execution result of the graphics instruction of the virtual machine changes an image of a primary surface of the virtual machine, allocate an execution sequence number to the graphics instruction of the virtual machine, so that the execution sequence number is carried in the graphics update instruction and is sent to the primary surface management unit, where the execution sequence number is allocated in ascending order or in descending order according to a time sequence of each graphics instruction, of the virtual machine, in the instruction queue; and the primary surface management unit is further configured to after the graphics update instruction is received, synthesize the new primary surface corresponding to the graphics update instruction according to the execution sequence number carried in the graphics update instruction.

With reference to the third possible implementation manner, in a fourth possible implementation manner, the primary surface management unit is further configured to acquire a first execution sequence number that is for execution of the synthesizing, by the primary surface management unit, a new primary surface at a previous time, and if a time sequence of the execution sequence number, carried in the graphics update instruction, in the instruction queue is not earlier than a time sequence of the first execution sequence number, synthesize the new primary surface corresponding to the graphics update instruction according to the first graphics update area, or if a time sequence of the execution sequence number, carried in the graphics update instruction, in the instruction queue is earlier than a time sequence of the first execution sequence number, modify the first graphics update area, and synthesize the new primary surface corresponding to the graphics update instruction according to the modified first graphics update area.

With reference to the second aspect or the first possible implementation manner, in a fifth possible implementation manner, the drawing instruction sent by the instruction queue unit to the graphics processing unit further includes a graphics moving identifier; and the three-dimensional rendering unit is further configured to acquire the rendering image that is sent by the graphics processing unit according to the graphics moving identifier and corresponds to the graphics instruction of the virtual machine.

A third aspect of the present disclosure provides an image update apparatus, including an acquiring interface configured to acquire a graphics instruction of a virtual machine, where the graphics instruction of the virtual machine carries a first graphics update area and graphics update content; a processor configured to determine a type of the graphics instruction of the virtual machine, and if the type of the graphics instruction of the virtual machine is a three-dimensional graphics instruction, send a drawing instruction to a graphics processing unit to perform rendering processing, where the drawing instruction carries the three-dimensional graphics instruction; acquire a rendering image corresponding to the graphics instruction of the virtual machine, and send a graphics update instruction to a primary surface management unit of the processor, where the graphics update instruction carries the rendering image and the first graphics update area; and acquire an original primary surface of the virtual machine, and synthesize a new primary surface according to the original primary surface of the virtual machine, the first graphics update area, and the rendering image; and a sending interface configured to send an image corresponding to the new primary surface to a client of the virtual machine.

With reference to the third aspect, in a first possible implementation manner, the processor is further configured to if the graphics instruction of the virtual machine is a two-dimensional graphics instruction, send a graphics update instruction to the primary surface management unit, where the graphics update instruction carries the two-dimensional graphics instruction and the first graphics update area; and acquire an original primary surface of the virtual machine, and synthesize a new primary surface according to the original primary surface of the virtual machine, the first graphics update area, and the two-dimensional graphics instruction; and the sending interface is configured to send an image corresponding to the new primary surface to a client of the virtual machine.

With reference to the third aspect or the first possible implementation manner, in a second possible implementation manner, the processor is further configured to acquire multiple graphics instructions of the virtual machine, and place the multiple graphics instructions of the virtual machine in an instruction queue to perform subsequent processing one by one.

With reference to the second possible implementation manner, in a third possible implementation manner, the processor is further configured to determine whether an execution result of the graphics instruction of the virtual machine changes an image of a primary surface of the virtual machine, and if the execution result of the graphics instruction of the virtual machine changes an image of a primary surface of the virtual machine, allocate an execution sequence number to the graphics instruction of the virtual machine, so that the execution sequence number is carried in the graphics update instruction and is sent to the primary surface management unit, where the execution sequence number is allocated in ascending order or in descending order according to a time sequence of each graphics instruction, of the virtual machine, in the instruction queue; and, after the graphics update instruction is received, synthesize the new primary surface corresponding to the graphics update instruction according to the execution sequence number carried in the graphics update instruction.

With reference to the third possible implementation manner, in a fourth possible implementation manner, the processor is further configured to acquire a first execution sequence number that is for execution of the synthesizing, by the primary surface management unit, a new primary surface at a previous time, and if a time sequence of the execution sequence number, carried in the graphics update instruction, in the instruction queue is not earlier than a time sequence of the first execution sequence number, synthesize the new primary surface corresponding to the graphics update instruction according to the first graphics update area, or if a time sequence of the execution sequence number, carried in the graphics update instruction, in the instruction queue is earlier than a time sequence of the first execution sequence number, modify the first graphics update area, and synthesize the new primary surface corresponding to the graphics update instruction according to the modified first graphics update area.

With reference to the third aspect or the first possible implementation manner, in a fifth possible implementation manner, the drawing instruction sent by the processor to the graphics processing unit further includes a graphics moving identifier; and the processor is further configured to acquire the rendering image that is sent by the graphics processing unit according to the graphics moving identifier and corresponds to the graphics instruction of the virtual machine.

The image update method in the embodiments of the present disclosure may include acquiring, by a render server, a graphics instruction of a virtual machine, where the graphics instruction of the virtual machine carries a first graphics update area and graphics update content; determining, by the render server, a type of the graphics instruction of the virtual machine; if the type of the graphics instruction of the virtual machine is a three-dimensional graphics instruction, sending, by the render server, a drawing instruction to a graphics processing unit to perform rendering processing, where the drawing instruction carries the three-dimensional graphics instruction, acquiring a rendering image corresponding to the graphics instruction of the virtual machine, and sending a graphics update instruction to a primary surface management unit of the render server, where the graphics update instruction carries the rendering image and the first graphics update area; and acquiring, by the primary surface management unit, an original primary surface of the virtual machine, synthesizing a new primary surface according to the original primary surface of the virtual machine, the first graphics update area, and the rendering image, and sending an image corresponding to the new primary surface to a client of the virtual machine.

In the embodiments of the present disclosure, after the graphics instruction of the virtual machine is obtained, first a type of the graphics instruction of the virtual machine needs to be determined, and manners of processing a three-dimensional graphics instruction and a two-dimensional graphics instruction are different, where the three-dimensional graphics instruction may be sent to the graphics processing unit for processing, and the two-dimensional graphics instruction does not need to be sent to the graphics processing unit and instead may be directly sent to a primary surface management unit for direct processing. In this way, it is not necessary to process all instructions in image capturing in the prior art, so that there is no need to concern about an overlapping problem that may occur between windows, and moreover, a two-dimensional graphics instruction does not need to be packaged into a three-dimensional graphics instruction for subsequent processing; obviously, a processing manner is more simple, and efficiency of acquiring an image is also improved.

DESCRIPTION OF EMBODIMENTS

Figure 1:
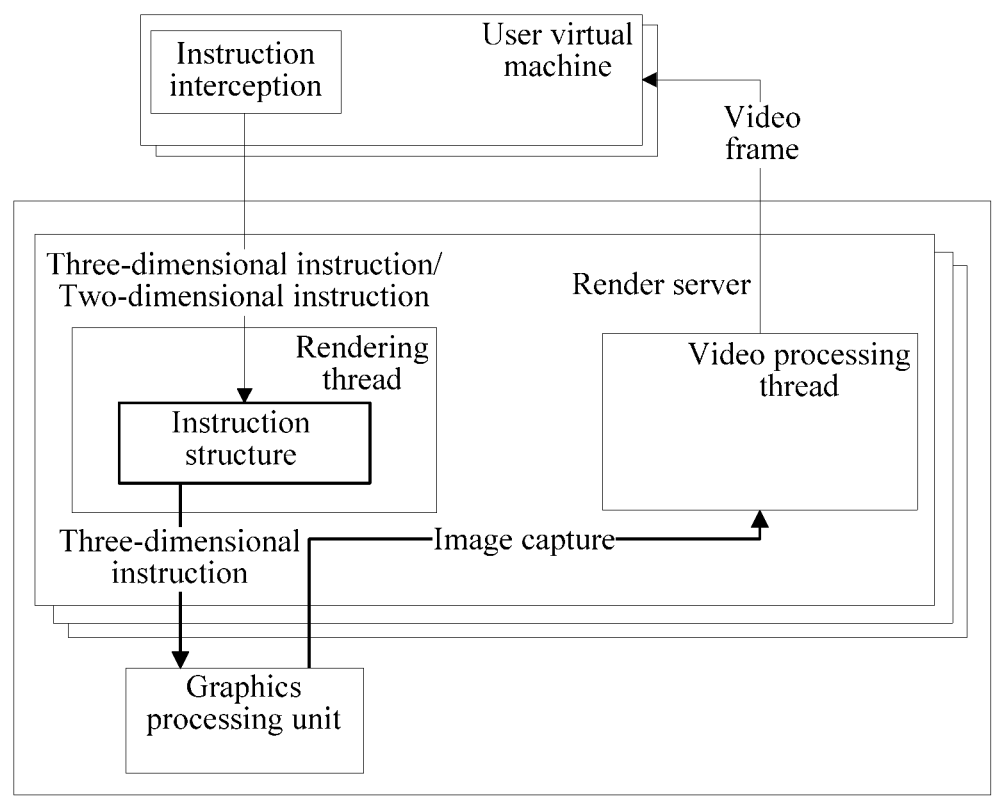
FIG. 1 is a schematic diagram of obtaining a remote login image in the prior art.

An image update method in embodiments of the present disclosure may include acquiring, by a render server, a graphics instruction of a virtual machine, where the graphics instruction of the virtual machine carries a first graphics update area and graphics update content; determining, by the render server, a type of the graphics instruction of the virtual machine; if the type of the graphics instruction of the virtual machine is a three-dimensional graphics instruction, sending, by the render server, a drawing instruction to a graphics processing unit to perform rendering processing, where the drawing instruction carries the three-dimensional graphics instruction, acquiring a rendering image corresponding to the graphics instruction of the virtual machine, and sending a graphics update instruction to a primary surface management unit of the render server, where the graphics update instruction carries the rendering image and the first graphics update area; and acquiring, by the primary surface management unit, an original primary surface of the virtual machine, synthesizing a new primary surface according to the original primary surface of the virtual machine, the first graphics update area, and the rendering image, and sending an image corresponding to the new primary surface to a client of the virtual machine.

In the embodiments of the present disclosure, after the graphics instruction of the virtual machine is obtained, first a type of the graphics instruction of the virtual machine may be determined, and manners of processing a three-dimensional graphics instruction and a two-dimensional graphics instruction are different, where the three-dimensional graphics instruction may be sent to the graphics processing unit for processing, and the two-dimensional graphics instruction does not need to be sent to the graphics processing unit and instead may be directly sent to the primary surface management unit for direct processing. In this way, it is not necessary to process all instructions in an image capture manner in the prior art, so that there is no need to concern about an overlapping problem that may occur between windows, and moreover, a two-dimensional graphics instruction does not need to be packaged into a three-dimensional graphics instruction for subsequent processing; obviously, a processing manner is relatively simple, and efficiency of acquiring an image is also improved.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure shall fall within the protection scope of the present disclosure.

In addition, the term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

Exemplary implementation manners of the present disclosure are described below in detail with reference to the accompanying drawings.

Embodiment 1

Figure 2:
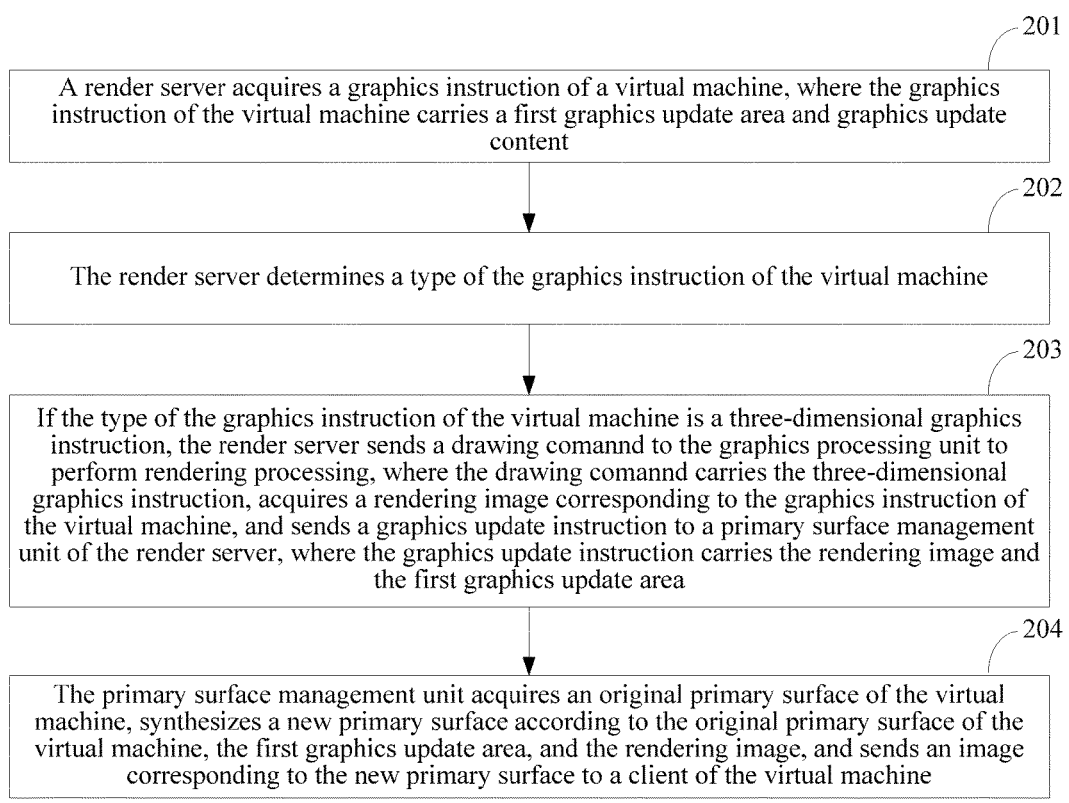
FIG. 2 is a main flowchart of an image update method according to an embodiment of the present disclosure.

Referring to FIG. 2, an embodiment of the present disclosure provides an image update method, and a main procedure of the method is as follows:

Step 201: A render server acquires a graphics instruction of a virtual machine, where the graphics instruction of the virtual machine carries a first graphics update area and graphics update content.

Figure 3:
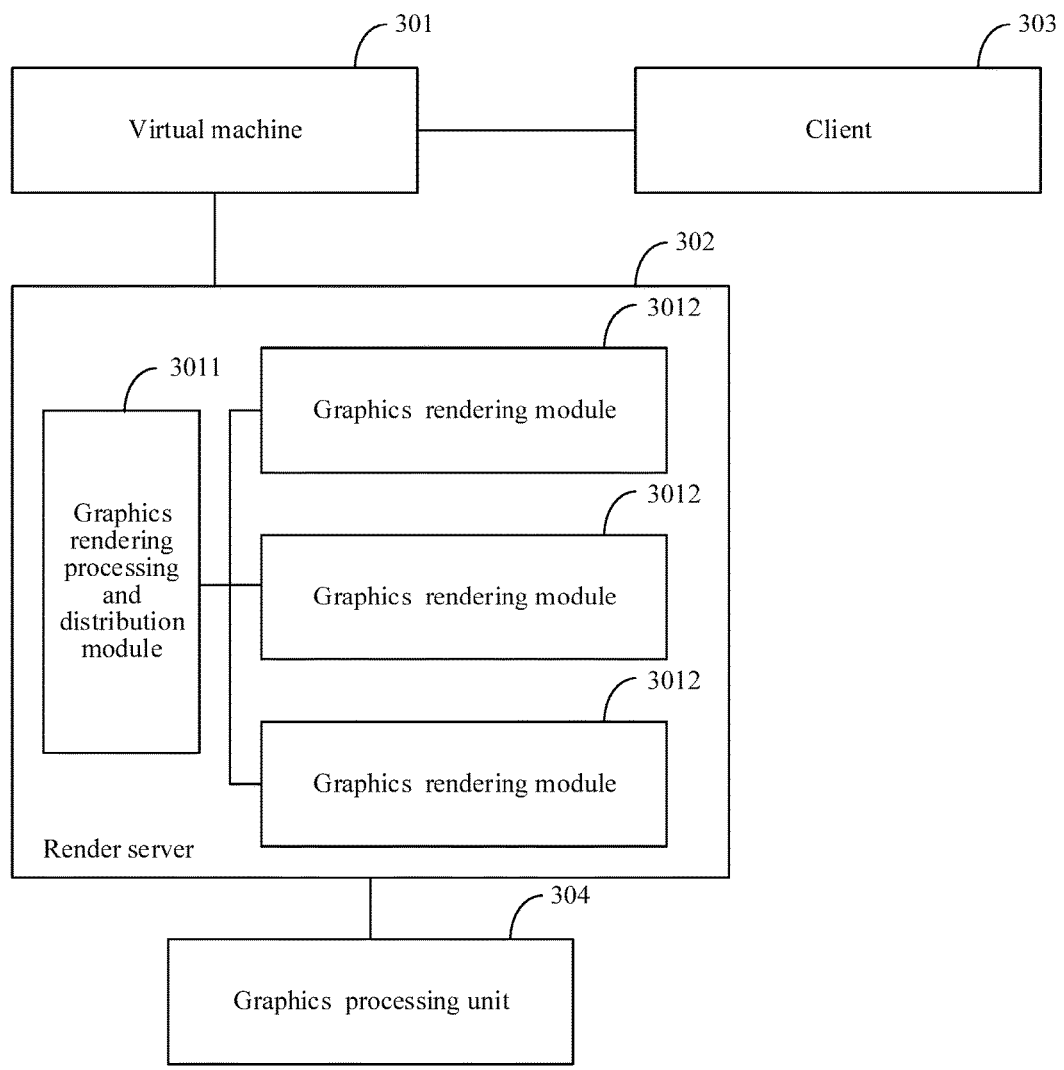
FIG. 3 is an overall architecture of an image update system according to the embodiment of the present disclosure.

Referring to FIG. 3, FIG. 3 shows an overall architecture of an image update system according to an embodiment of the present disclosure, where the image update system mainly includes three parts: a user virtual machine (VM) (specifically, a virtual machine 301 in FIG. 3), a render server (specifically, a render server 302 in FIG. 3), and an high definition play (HDP) client (specifically, a client 303 in FIG. 3).

A GPU (specifically, a graphics processing unit 304 in FIG. 3) needs to be used during image processing, and therefore FIG. 3 also shows the graphics processing unit 304. As can be seen from FIG. 3, the graphics processing unit 304 may be connected to the render server 302.

In this embodiment of the present disclosure, the image update system may include the graphics processing unit 304, or may not include the graphics processing unit 304.

As can be seen from FIG. 3, the render server 302 may include a Windows® display driver model (WDDM) Render (specifically, a graphics rendering processing and distribution module 3011 in FIG. 3), at least one WDDM Render (specifically, a graphics rendering module 3012 in FIG. 3). In FIG. 3, three graphics rendering modules 3012 are used as an example.

The virtual machine 301 may obtain the graphics instruction of the virtual machine, and may transmit the graphics instruction of the virtual machine to the graphics rendering processing and distribution module 3011 in the render server 302. The graphics rendering processing and distribution module 3011 may transmit the graphics instruction of the virtual machine to a corresponding graphics rendering module 3012. The graphics rendering module 3012 may obtain a corresponding image according to the graphics instruction of the virtual machine, or may update, according to the obtained image, a desktop image that is maintained by the graphics rendering module 3012 and is related to the client 303, and may directly transmit the updated desktop image to the virtual machine 301. The virtual machine 301 may send the received desktop image to the client 303, so that the client 303 may perform display according to the received desktop image.

The image update system may include multiple virtual machines 301, and only one virtual machine is shown in FIG. 3. The image update system may include multiple virtual machines 301, and therefore the render server 302 may set one corresponding graphics rendering module 3012 for each virtual machine 301 (for example, three graphics rendering modules are shown in FIG. 3, and the three graphics rendering modules 3012 may correspond to three virtual machines 301). In this case, when receiving the graphics instruction of the virtual machine, the render server 302 needs to know which virtual machine 301 the graphics instruction of the virtual machine is specifically from, so as to allocate the graphics instruction of the virtual machine to a corresponding graphics rendering module 3012 for processing. Therefore, the virtual machine 301 may first transmit the graphics instruction of the virtual machine to the graphics rendering processing and distribution module 3011 in the render server 302, where the graphics instruction of the virtual machine may carry virtual machine identifier information of the corresponding virtual machine 301. For example, the graphics rendering processing and distribution module 3011 may store a set of correspondences between identifier information of the graphics rendering modules 3012 and virtual machine identifier information. The graphics rendering processing and distribution module 3011 may know, according to the virtual machine identifier information carried in the graphics instruction of the virtual machine, which virtual machine 301 the graphics instruction of the virtual machine specifically corresponds to, and may find, from the set of the correspondences, a graphics rendering module 3012 corresponding to the virtual machine 301, so that the graphics rendering processing and distribution module 3011 may allocate the graphics instruction of the virtual machine to a correct graphics rendering module 3012 for processing.

Moreover, each graphics rendering module 3012 may separately correspond to one client 303. The image update system may include multiple clients 303. For example, there are three graphics rendering modules 3012 in FIG. 3, and therefore, there may be three corresponding clients 303. However, only one client 303 is shown as an example in FIG. 3.

The render server 302 is mainly introduced in this embodiment of the present disclosure, and the graphics rendering module 3012 in the render server 302 is mainly introduced. Therefore, step 201 of obtaining a graphics instruction of a virtual machine may refer to that one of the graphics rendering modules 3012 obtains the graphics instruction of the virtual machine. Specifically, before step 201 is executed, the graphics rendering processing and distribution module 3011 has finished a process of distributing the graphics instruction of the virtual machine. Moreover, the graphics instruction of the virtual machine is from one virtual machine 301, and it can be known, according to the virtual machine identifier information carried in the graphics instruction of the virtual machine, which virtual machine 301 the graphics instruction of the virtual machine specifically corresponds to, so that the graphics instruction of the virtual machine can be allocated to a correct graphics rendering module 3012 for processing.

In this embodiment of the present disclosure, the render server 302 may further include an instruction queue unit, a three-dimensional rendering unit, a primary surface management unit, and a sending unit. Preferably, the instruction queue unit, the three-dimensional rendering unit, the primary surface management unit, and the sending unit may be all located in the graphics rendering module 3012.

Each graphics rendering module 3012 may separately correspond to one client 303, and therefore in this embodiment of the present disclosure, upon receiving the graphics instruction of the virtual machine, the instruction queue unit naturally knows the client 303 that the graphics instruction of the virtual machine is for, and therefore, in step 201, the instruction queue unit obtains the graphics instruction of the virtual machine for a first client.

In FIG. 3, the graphics rendering processing and distribution module 3011 and the graphics rendering module 3012 may both be connected to the virtual machine 301.

In this embodiment of the present disclosure, the render server 302 may acquire the graphics instruction of the virtual machine sent by the virtual machine 301, and the graphics instruction of the virtual machine may carry the first graphics update area and the graphics update content. The first graphics update area may be specifically one area identifier, and the first graphics update area may be used for indicating a specific location of content to be updated in an original primary surface of the virtual machine 301.

That the render server 302 acquires the graphics instruction of the virtual machine sent by the virtual machine 301 may be that the instruction queue unit acquires the graphics instruction of the virtual machine sent by the virtual machine 301.

Step 202: The render server 302 determines a type of the graphics instruction of the virtual machine.

After receiving the graphics instruction of the virtual machine, the instruction queue unit may determine a type of the graphics instruction of the virtual machine. In this embodiment of the present disclosure, there may be basically two types of the graphics instructions of the virtual machine: a 3D graphics instruction and a 2D graphics instruction. Therefore, determining a type of the graphics instruction of the virtual machine in step 202 is determining whether the graphics instruction of the virtual machine is the three-dimensional graphics instruction or the two-dimensional graphics instruction.

Preferably, in another embodiment of the present disclosure, after determining a type of the graphics instruction of the virtual machine, the instruction queue unit may further determine whether an execution result of the graphics instruction of the virtual machine can change an image of a primary surface of the virtual machine 301. In this embodiment of the present disclosure, the primary surface of the virtual machine 301 may be, for example, a desktop of the virtual machine 301, and therefore, the image of the primary surface of the virtual machine 301 may be a desktop image of the virtual machine 301.

That the image of the primary surface of the virtual machine 301 is changed is specifically that the execution result of the graphics instruction of the virtual machine can change display content of the image of the primary surface of the virtual machine 301; for example, an icon, a text, and the like in the image of the primary surface may be changed. That the image of the primary surface of the virtual machine 301 is not changed is specifically that the execution result of the graphics instruction of the virtual machine does not change the display content of the image of the primary surface of the virtual machine 301.

In this embodiment of the present disclosure, an instruction queue may be maintained in the instruction queue unit. Every time the instruction queue unit receives an instruction, the instruction queue unit may place the instruction in the instruction queue in order. The instruction queue unit may use a first-in first-out rule, specifically, an instruction that is received first may leave the queue first. In this embodiment, after the graphics instruction of the virtual machine is received, the graphics instruction of the virtual machine may be placed in the instruction queue, and subsequently a type of the graphics instruction of the virtual machine may be determined.

If it is determined that the graphics instruction of the virtual machine changes the image of the primary surface of the virtual machine 301, the instruction queue unit may allocate an execution sequence number to the graphics instruction of the virtual machine. The execution sequence number may be used for representing a processing sequence of the graphics instruction of the virtual machine. The execution sequence number may be allocated in ascending order or in descending order according to a time sequence of each the graphics instruction of the virtual machine in the instruction queue in the instruction queue unit.

The processing sequence mainly refers to that when the image of the primary surface of the corresponding virtual machine 301 is updated according to a rendering image after the rendering image is obtained according to the graphics instruction of the virtual machine, if the rendering image carries the execution sequence number, processing needs to be performed according to a processing sequence of each execution sequence number.

If the graphics instruction of the virtual machine is the three-dimensional graphics instruction and if the instruction queue unit has allocated the execution sequence number to the graphics instruction of the virtual machine, after the graphics processing unit 304 generates the rendering image according to the graphics instruction of the virtual machine, the rendering image may still continue to carry the execution sequence number. Therefore, after obtaining the rendering image, the primary surface management unit may synthesize a new primary surface according to the execution sequence number carried in the rendering image.

If the graphics instruction of the virtual machine is the two-dimensional graphics instruction and if the instruction queue unit has allocated an execution sequence number to the graphics instruction of the virtual machine, the instruction queue unit may directly send the graphics update instruction to the primary surface management unit according to the two-dimensional graphics instruction, where the graphics update instruction may continue to carry the execution sequence number. Therefore, after obtaining the graphics update instruction, the primary surface management unit may synthesize a new primary surface of the virtual machine 301 according to the execution sequence number carried in the graphics update instruction.

Because in this embodiment of the present disclosure, the instruction queue may be maintained in the instruction queue unit, the render server 302 may acquire multiple graphics instructions of the virtual machine, and may place all the obtained multiple graphics instructions of the virtual machine in the instruction queue to perform subsequent processing one by one.

Preferably, in another embodiment of the present disclosure, after the instruction queue unit obtains the graphics instruction of the virtual machine, the drawing instruction sent to the graphics processing unit 304 may further include a graphics moving identifier, and graphics moving identifier may be carried in the drawing instruction.

For example, the instruction queue unit may generate the graphics moving identifier, and the graphics moving identifier may be periodically added to the corresponding graphics instruction, of the virtual machine, in the instruction queue. Because the drawing instruction carries the three-dimensional graphics instruction, the drawing instruction naturally also carries the graphics moving identifier.

Step 203: If the type of the graphics instruction of the virtual machine is a three-dimensional graphics instruction, the render server sends a drawing instruction to the graphics processing unit 304 to perform rendering processing, where the drawing instruction carries the three-dimensional graphics instruction, acquires a rendering image corresponding to the graphics instruction of the virtual machine, and sends a graphics update instruction to a primary surface management unit of the render server, where the graphics update instruction carries the rendering image and the first graphics update area.

As can be seen from FIG. 3, the render server 302 is connected to the graphics processing unit 304, thus, the instruction queue unit may send the three-dimensional graphics instruction to the graphics processing unit 304 for processing, and the graphics processing unit 304 performs rendering on the three-dimensional graphics instruction, to obtain the rendering image corresponding to the graphics instruction of the virtual machine. After obtaining the rendering image, the graphics processing unit 304 may transmit the rendering image to the render server 302.

After obtaining the rendering image, the graphics processing unit 304 may transmit the rendering image to a three-dimensional rendering module of the render server 302, and the three-dimensional rendering module may generate the graphics update instruction according to the rendering image, and send the graphics update instruction to the primary surface management module, where the graphics update instruction may carry the rendering image and the first graphics update area.

In this embodiment of the present disclosure, before sending the graphics instruction of the virtual machine to the graphics processing unit 304 for processing, the render server 302 may first determine whether a format of the graphics instruction of the virtual machine is a format that can be recognized by the graphics processing unit 304. If the format of the graphics instruction of the virtual machine is not a format that can be recognized by the graphics processing unit 304, the render server 302 may convert the format of the graphics instruction of the virtual machine into a format that can be recognized by the graphics processing unit 304 and then send the graphics instruction to the graphics processing unit 304, so that the graphics processing unit 304 can recognize the graphics instruction of the virtual machine.

If the graphics instruction of the virtual machine is the three-dimensional graphics instruction, the instruction queue unit needs to send the three-dimensional graphics instruction to the graphics processing unit 304 for processing, where the instruction queue unit may first send the three-dimensional graphics instruction to the three-dimensional rendering unit, and if the three-dimensional rendering unit determines that the format of the three-dimensional graphics instruction is not a format that can be recognized by the graphics processing unit 304, the three-dimensional rendering unit may convert the format of the three-dimensional graphics instruction into a format that can be recognized by the graphics processing unit 304 and then send the three-dimensional graphics instruction to the graphics processing unit 304 for processing, so as to obtain, from the graphics processing unit 304, the rendering image corresponding to the three-dimensional graphics instruction.

Because generally, a format of an instruction obtained from the virtual machine 301 is different from a format of an instruction that can be recognized by the graphics processing unit 304, a process of converting an instruction format is needed in the middle. In this embodiment of the present disclosure, such a process of converting an instruction format may be accomplished by the three-dimensional rendering unit.

Preferably, in another embodiment of the present disclosure, if one graphics instruction of the virtual machine carries the graphics moving identifier, and if the graphics processing unit 304 receives the graphics instruction of the virtual machine, after obtaining the rendering image according to the graphics instruction of the virtual machine, the graphics processing unit 304 may send, to the render server 302, all rendering images that are generated after the graphics processing unit 304 is started or after a previous graphics instruction, carrying the graphics moving identifier, of the virtual machine is executed and before processing of this graphics instruction of the virtual machine is completed, and specifically, the graphics processing unit 304 may send all the rendering images to the three-dimensional rendering unit. A task of the graphics moving identifier is to obtain, from the graphics processing unit 304, all rendering images that are generated before the graphics processing unit 304 obtains the graphics moving identifier.

The instruction queue unit may add the graphics moving identifier to the graphics instruction of the virtual machine at different moments according to an actual condition.

For example, if in the instruction queue, only one graphics instruction of the virtual machine carries the graphics moving identifier, after obtaining the graphics moving identifier, the graphics processing unit 304 may send, to the render server 302, all rendering images that are generated after the graphics processing unit 304 is started and before the graphics processing unit 304 obtains the graphics moving identifier.

For example, if in the instruction queue, at least two graphics instructions of the virtual machine carry the graphics moving identifier, for example, a graphics instruction of a first virtual machine and a graphics instruction of a second virtual machine both carry the graphics moving identifier, and for example, in the instruction queue, the graphics instruction of the second virtual machine comes before the graphics instruction of the first virtual machine, thus, when receiving the graphics instruction of the first virtual machine, the graphics processing unit 304 has executed the graphics instruction of the second virtual machine, after obtaining the graphics instruction of the first virtual machine, the graphics processing unit 304 may send, to the render server 302, all rendering images that are generated after the graphics instruction of the second virtual machine is executed and before the graphics instruction of the first virtual machine is obtained.

In this embodiment of the present disclosure, the graphics processing unit 304 may also send a rendering image to the render server 302 every time the graphics processing unit 304 generates a rendering image; however, this manner is relatively time-consuming. Therefore, a manner of adding the graphics moving identifier to the graphics instruction of the virtual machine may be used. For example, the graphics moving identifier may be periodically added to the graphics instruction, of the virtual machine, in the instruction queue. After receiving the graphics moving identifier, the graphics processing unit 304 sends rendering images to the render server 302 in batches. In this way, a total time required for transmission of the rendering images in batches is less than a total time required for transmission of rendering images one by one, so that time may be saved, and operation efficiency is improved.

In this embodiment of the present disclosure, if the graphics instruction of the virtual machine is the two-dimensional graphics instruction, the render server 302 may send a graphics update instruction to the primary surface management unit. The graphics update instruction may carry the two-dimensional graphics instruction and the first graphics update area. The primary surface management unit may acquire an original primary surface of the virtual machine 301, synthesize a new primary surface according to the original primary surface of the virtual machine 301, the first graphics update area, and the two-dimensional graphics instruction, and send an image corresponding to the new primary surface to the client 303 of the virtual machine 301.

In this embodiment of the present disclosure, if it is determined that the type of the graphics instruction of the virtual machine is the two-dimensional graphics instruction, the instruction queue module may send a graphics update instruction to the primary surface management unit. The primary surface management module may prestore an original primary surface of the virtual machine 301, so that after obtaining the graphics update instruction, the primary surface management module may synthesize a new primary surface of the virtual machine 301 according to the original primary surface of the virtual machine 301 and the graphics update instruction.

In this embodiment of the present disclosure, if it is determined that the type of the graphics instruction of the virtual machine is the two-dimensional graphics instruction, the instruction queue unit may directly send the two-dimensional graphics instruction to the primary surface management unit, and the primary surface management unit may directly perform processing according to the two-dimensional graphics instruction to obtain a new primary surface of the virtual machine 301, and does not need to package the two-dimensional graphics instruction into a three-dimensional graphics instruction and then send the three-dimensional graphics instruction to the graphics processing unit 304 for processing, so that operation steps are reduced, an operation procedure is simplified, and operation efficiency is also obviously improved.

Moreover, in this embodiment of the present disclosure, the three-dimensional graphics instruction may be directly used to perform rendering processing in the graphics processing unit 304, the two-dimensional graphics instruction may be directly processed in the primary surface management unit, and it is not necessary to obtain an image in an image capture manner, so that a technical problem that a complete image cannot be obtained because windows for image capture are overlapped is avoided, and integrity of an acquired image is improved.

Because each render server 302 may correspond to one virtual machine 301, each render server 302 may maintain one original primary surface corresponding to the virtual machine 301 that corresponds to the render server 302. The original primary surface may be specifically maintained in the primary surface management unit. The primary surface management module may prestore the original primary surface of the virtual machine 301.

For example, the virtual machine 301 corresponding to one render server 302 is a first virtual machine, and in this case, a first primary surface corresponding to the first virtual machine may be maintained in the primary surface management unit of the virtual machine 301. An image corresponding to the first primary surface is an image, of a primary surface, needing to be sent to a first client for display. The first client is a client 303 corresponding to the first virtual machine, and therefore the first client may also be referred to as a client of the first virtual machine.

In this embodiment of the present disclosure, mainly one virtual machine 301 is described. Therefore, after an image of a new primary surface of the virtual machine 301 is obtained, the image corresponding to the new primary surface may be sent to the client 303 of the virtual machine 301.

Step 204: The primary surface management unit acquires an original primary surface of the virtual machine 301, synthesizes a new primary surface according to the original primary surface of the virtual machine 301, the first graphics update area, and the rendering image, and sends an image corresponding to the new primary surface to a client 303 of the virtual machine 301.

If the graphics instruction of the virtual machine is the three-dimensional graphics instruction, the primary surface management unit obtains the rendering image transmitted from the graphics processing unit 304. If the graphics instruction of the virtual machine is the two-dimensional graphics instruction, the primary surface management unit obtains the two-dimensional graphics instruction, and the primary surface management unit may synthesize a new primary surface of the virtual machine 301 according to the two-dimensional graphics instruction.

Therefore, the primary surface management unit may send an image corresponding to the new primary surface of the virtual machine 301 to the client 303 corresponding to the virtual machine 301.

In this embodiment of the present disclosure, when synthesizing the new primary surface according to the original primary surface of the virtual machine, the first graphics update area, and the rendering image, the primary surface management unit may first determine whether the graphics update instruction carries the execution sequence number.

If determining that the graphics update instruction does not carry the execution sequence number, the primary surface management unit may directly synthesize the new primary surface according to the graphics update instruction and the original primary surface of the virtual machine.

If determining that the graphics update instruction carries the execution sequence number, the primary surface management unit may acquire a first execution sequence number that is for execution of the synthesizing, by the primary surface management unit, a new primary surface at a previous time, and if a time sequence of the execution sequence number, carried in the graphics update instruction, in the instruction queue is not earlier than a time sequence of the first execution sequence number, synthesize the new primary surface corresponding to the graphics update instruction according to the first graphics update area, or if a time sequence of the execution sequence number, carried in the graphics update instruction, in the instruction queue is earlier than a time sequence of the first execution sequence number, modify the first graphics update area, and synthesize the new primary surface corresponding to the graphics update instruction according to the modified first graphics update area.

The modifying the first graphics update area may refer to: The primary surface management unit may determine a first area corresponding to the first execution sequence number in the original primary surface, and may determine a second area corresponding to the execution sequence number in the original primary surface; after determining the first area and the second area, may determine a third area in the original primary surface, where the third area is a remaining area after the first area is removed from the second area, and the third area is an area represented by the modified first graphics update area, so that the new primary surface corresponding to the graphics update instruction may be synthesized according to the modified first graphics update area.

In this embodiment of the present disclosure, if the graphics instruction of the virtual machine carries the execution sequence number, after the graphics update instruction is obtained according to the graphics instruction of the virtual machine, the graphics update instruction may further continue to carry the execution sequence number.

In this embodiment of the present disclosure, when the primary surface management unit processes the graphics update instruction, synthesizes the new primary surface according to the graphics update instruction, if the graphics update instruction carries the execution sequence number, the primary surface management unit may acquire a first execution sequence number that is for execution of the synthesizing, by the primary surface management unit, a new primary surface at a previous time, and determine whether a time sequence of the execution sequence number, carried in the graphics update instruction, in the instruction queue is earlier than a time sequence of the first execution sequence number. If the time sequence of the execution sequence number, carried in the graphics update instruction, in the instruction queue is earlier than the time sequence of the first execution sequence number, the primary surface management unit needs to determine a graphics instruction, of each virtual machine, corresponding to each execution sequence number that comes before the execution sequence number, and separately determine areas, corresponding to these graphics instructions of the virtual machine, in the original primary surface. Next, when synthesizing the new primary surface according to the graphics update instruction, the primary surface management unit first needs to remove the separately determined areas from the original primary surface, and then synthesizes the new primary surface according to the graphics update instruction.

An execution sequence number is set, and therefore it indicates that these graphics instructions, of the virtual machines, causing changes to the original primary surface are in a specific order. In this embodiment of the present disclosure, if a graphics instruction, of a virtual machine, occurring later is processed in advance, during processing, the graphics instruction should be kept from affecting an area corresponding to a graphics instruction, of a virtual machine, occurring at an earlier time. Otherwise, the client 303 may not see a reproduction of an actual primary surface condition of a corresponding virtual machine 301.

For example, when the primary surface management unit processes the graphics update instruction, synthesizes the new primary surface according to the graphics update instruction, if the graphics update instruction carries the execution sequence number, the primary surface management unit may acquire a first execution sequence number that is for execution of the synthesizing, by the primary surface management unit, a new primary surface at a previous time, and determine whether a time sequence of the execution sequence number, carried in the graphics update instruction, in the instruction queue is earlier than a time sequence of the first execution sequence number, or may also specifically determine whether a graphics update instruction whose time sequence in the instruction queue is later than the execution sequence number is processed in advance. If it is determined that time sequences of a second execution sequence number and a third execution sequence number come after the first execution sequence number, but a graphics instruction, of a second virtual machine, corresponding to the second execution sequence number and a graphics instruction, of a third virtual machine, corresponding to the third execution sequence number have been processed, the primary surface management unit may determine an area A corresponding to the second execution sequence number in the original primary surface, an area B corresponding to the third execution sequence number in the original primary surface, and an area C corresponding to the execution sequence number in the original primary surface.

Next, when the new primary surface is synthesized according to the graphics update instruction, the determined area A and area B need to be removed from the original primary surface first, and then the new primary surface is synthesized according to the graphics update instruction. For example, an entire first desktop image is D, an area after the area A and the area B are removed is D-A-B, and the new primary surface is synthesized according to the graphics update instruction and the area D-A-B.

Preferably, for example, the entire first desktop image is D, and the area after the area A and the area B are removed is D-A-B. Because the area corresponding to the execution sequence number in the original primary surface is the area C, the area A and the area B may be removed from the area C. Therefore, C-A-B is an area corresponding to the modified first graphics update area, and the new primary surface corresponding to the graphics update instruction may be synthesized according to the modified first graphics update area.

Therefore, there may be several conditions as follows: if the area A and the area C have an intersection, and the area B and the area C do not have an intersection, C-A-B is equivalent to C-A; if the area B and the area C have an intersection, and the area A and the area C do not have an intersection, C-A-B is equivalent to C-B; if the area B and the area C have an intersection, and the area A and the area C also have an intersection, C-A-B is equivalent to C-A-B; and if the area B and the area C do not have an intersection, and the area A and the area C also do not have an intersection, C-A-B is equivalent to C.

Figure 4:
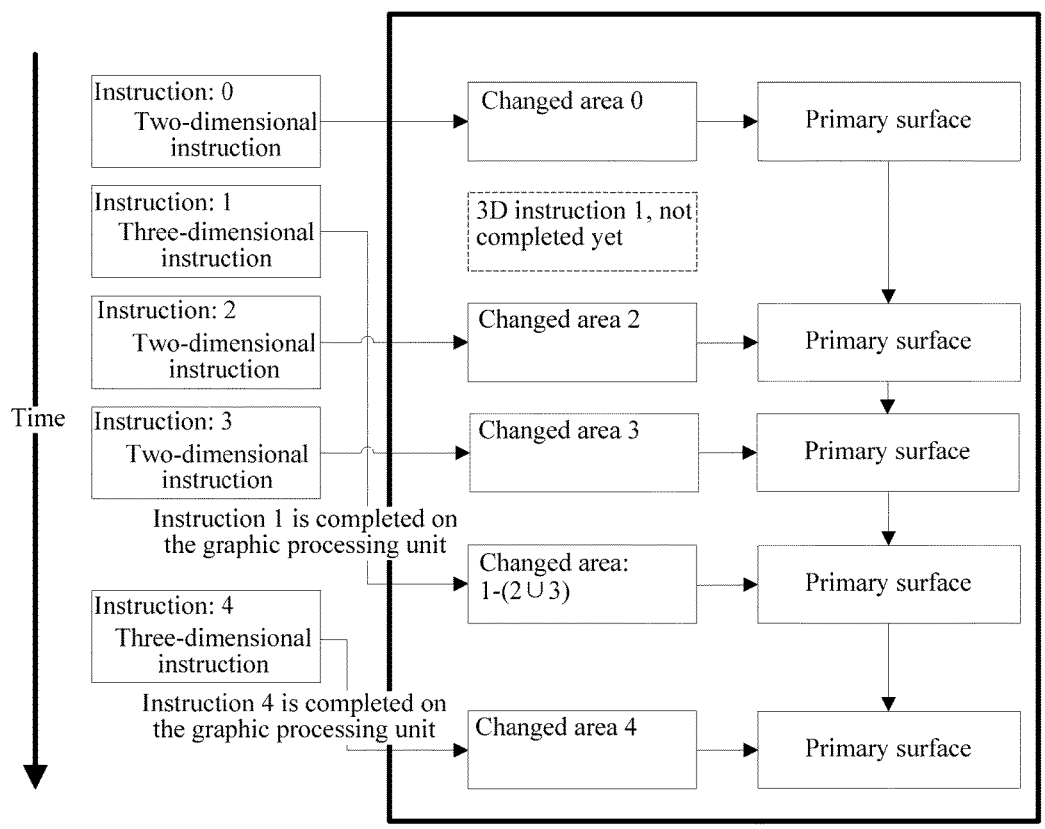
FIG. 4 is a schematic flowchart of synthesizing a new primary surface according to an embodiment of the present disclosure.

FIG. 4 shows a specific example in which the primary surface management unit synthesizes the new primary surface corresponding to the graphics update instruction according to the execution sequence number carried in the graphics update instruction.

FIG. 4 shows five graphics update instructions, where an instruction 0 to an instruction 4 are respectively a graphics update instruction 0 to a graphics update instruction 4, and a timeline represents that a time sequence of the instruction 0 is the earliest, and a time sequence of the instruction 4 is the latest.

The instruction 0 is a two-dimensional graphics instruction, and a changed area corresponding to the instruction 0 in the original primary surface is a changed area 0.

In this embodiment of the present disclosure, the graphics update instruction is obtained according to the graphics instruction of the virtual machine, so that if the graphics instruction of the virtual machine is the three-dimensional graphics instruction, the graphics update instruction may also be regarded as the three-dimensional graphics instruction. If the graphics instruction of the virtual machine is the two-dimensional graphics instruction, the graphics update instruction may also be regarded as the two-dimensional graphics instruction.

During processing of the instruction 0, because the instruction 0 carries an execution sequence number 0, a first execution sequence number that is for execution of the synthesizing, by the primary surface management unit, a new primary surface at a previous time may be acquired, and it is determined whether a time sequence of the execution sequence number, carried in the graphics update instruction, in the instruction queue is earlier than a time sequence of the first execution sequence number. In this embodiment of the present disclosure, it is determined that a time sequence of the execution sequence number 0 in the instruction queue is not earlier than the time sequence of the first execution sequence number, and therefore the new primary surface may be directly synthesized according to the instruction 0.

The instruction 1 is a three-dimensional graphics instruction, and during processing of the instruction 2, processing of the instruction 1 is not completed yet. After processing of the instruction 0 is completed, the instruction 1 is supposed to be processed, but because processing of the instruction 1 is not completed yet, the instruction 2 is processed first.

During processing of the instruction 2, because the instruction 2 carries an execution sequence number 2, a first execution sequence number that is for execution of the synthesizing, by the primary surface management unit, a new primary surface at a previous time may be acquired, and it is determined whether the time sequence of the execution sequence number, carried in the graphics update instruction, in the instruction queue is earlier than the time sequence of the first execution sequence number. In this embodiment of the present disclosure, it is determined that a time sequence of the execution sequence number 2 in the instruction queue is not earlier than the time sequence of the first execution sequence number, and therefore the new primary surface may be directly synthesized according to the instruction 2.

After processing of the instruction 2 is completed, continue to process the instruction 3. The instruction 3 is a two-dimensional graphics instruction, and a changed area corresponding to the instruction 3 in the original primary surface is a changed area 3.

During processing of the instruction 3, because the instruction 3 carries an execution sequence number 3, a first execution sequence number that is for execution of the synthesizing, by the primary surface management unit, a new primary surface at a previous time may be acquired, and it is determined whether the time sequence of the execution sequence number, carried in the graphics update instruction, in the instruction queue is earlier than the time sequence of the first execution sequence number. In this embodiment of the present disclosure, it is determined that a time sequence of the execution sequence number 3 in the instruction queue is not earlier than the time sequence of the first execution sequence number, and therefore the new primary surface may be directly synthesized according to the instruction 3.

After processing of the instruction 2 and the instruction 3 is completed, processing of the instruction 1 is already completed on the graphics processing unit 304, and the primary surface management unit obtains a rendering image corresponding to the instruction 1, and therefore needs to process the instruction 1.

During processing of the instruction 1, because the instruction 1 carries an execution sequence number 1, a first execution sequence number that is for execution of the synthesizing, by the primary surface management unit, a new primary surface at a previous time may be acquired, and it is determined whether the time sequence of the execution sequence number, carried in the graphics update instruction, in the instruction queue is earlier than the time sequence of the first execution sequence number. In this embodiment of the present disclosure, it is determined that the time sequence of the execution sequence number 1 in the instruction queue is earlier than the time sequence of the execution sequence number 2 and the time sequence of the execution sequence number 3, and therefore an area 1 corresponding to the instruction 1 in the primary surface, an area 2 corresponding to the instruction 2 in the primary surface, and an area 3 corresponding to the instruction 3 in the primary surface may be determined. Originally, an area corresponding to the first graphics update area is the area 1, and now the first graphics update area needs to be modified. An area corresponding to the modified first graphics update area is an area 1-(2∪3). Therefore, the new primary surface is synthesized according to the modified first graphics update area.

After processing of the instruction 1 is completed, continue to process the instruction 4. The instruction 4 is a three-dimensional graphics instruction, and a changed area corresponding to the instruction 4 in the original primary surface is a changed area 4.

During processing of the instruction 4, because the instruction 4 carries an execution sequence number 4, a first execution sequence number that is for execution of the synthesizing, by the primary surface management unit, a new primary surface at a previous time may be acquired, and it is determined whether the time sequence of the execution sequence number, carried in the graphics update instruction, in the instruction queue is earlier than the time sequence of the first execution sequence number. In this embodiment of the present disclosure, it is determined that a time sequence of the execution sequence number 4 in the instruction queue is not earlier than the time sequence of the first execution sequence number, and therefore the new primary surface may be directly synthesized according to the instruction 4.

In this embodiment of the present disclosure, after the new primary surface is obtained, the sending unit may send an image corresponding to the new primary surface to the client 303 of the virtual machine 301. After receiving the image corresponding to the new primary surface, the client 303 may update an image of a current primary surface of the client 303 according to the image corresponding to the new primary surface.

In this embodiment of the present disclosure, the render server 302 may further include an encoding module.

After obtaining the image corresponding to the new primary surface, the primary surface management unit may send the image corresponding to the new primary surface to the encoding module, and the encoding module may perform a corresponding operation such as video stream encoding on the image corresponding to the new primary surface, and subsequently the sending unit may send the encoded image corresponding to the new primary surface to the virtual machine 301. The virtual machine 301 may send the encoded image corresponding to the new primary surface to the client 303.

An image update system and an image update apparatus in the embodiments of the present disclosure are introduced below with reference to the accompanying drawings.

Embodiment 2

Figure 5:
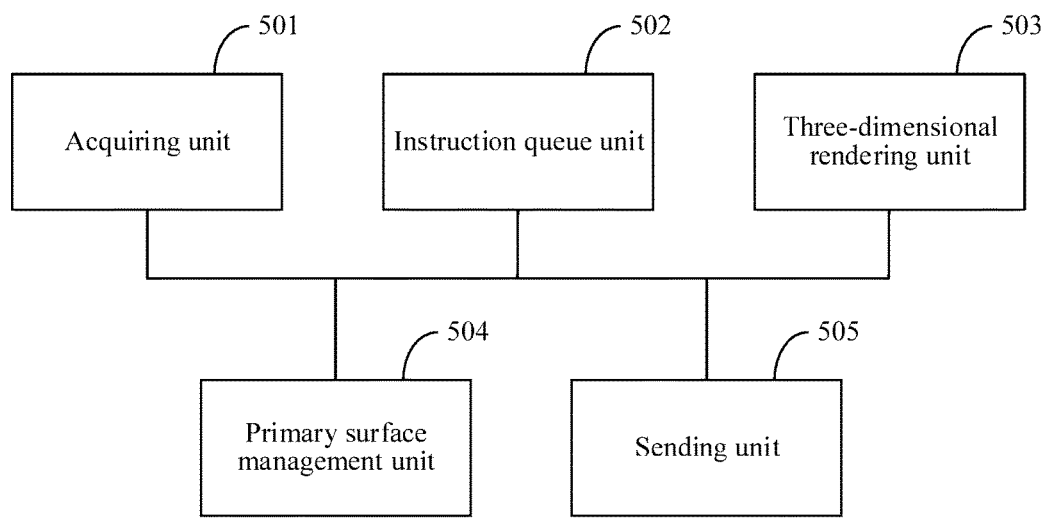
FIG. 5 is a structural diagram of an image update system according to an embodiment of the present disclosure.

Referring to FIG. 5, an embodiment of the present disclosure provides an image update system. The system may include an acquiring unit 501, an instruction queue unit 502, a three-dimensional rendering unit 503, a primary surface management unit 504, and a sending unit 505. Preferably, the system may be located in the render server 302 in Embodiment 1, or preferably, the system may be located in the graphics rendering module 3012 in the render server 302, or preferably, the system may be the graphics rendering module 3012 in the render server 302 itself.

Preferably, the acquiring unit 501 in Embodiment 2 and the acquiring unit in Embodiment 1 may be a same functional unit, the instruction queue unit 502 in Embodiment 2 and the instruction queue unit in Embodiment 1 may be a same functional unit, the three-dimensional rendering unit 503 in Embodiment 2 and the three-dimensional rendering unit in Embodiment 1 may be a same functional unit, the primary surface management unit 504 in Embodiment 2 and the primary surface management unit in Embodiment 1 may be a same functional unit, and the sending unit 505 in Embodiment 2 and the sending unit in Embodiment 1 may be a same functional unit.

The acquiring unit 501 may be configured to acquire a graphics instruction of a virtual machine, where the graphics instruction of the virtual machine carries a first graphics update area and graphics update content.

In this embodiment of the present disclosure, the acquiring unit 501 may be configured to obtain the graphics instruction of the virtual machine from the virtual machine 301.

The instruction queue unit 502 may be configured to determine a type of the graphics instruction of the virtual machine; and if the type of the graphics instruction of the virtual machine is a three-dimensional graphics instruction, send a drawing instruction to a graphics processing unit 304 to perform rendering processing, where the drawing instruction carries the three-dimensional graphics instruction.

In this embodiment of the present disclosure, after receiving the graphics instruction of the virtual machine, the instruction queue unit 502 may determine a type of the graphics instruction of the virtual machine. In this embodiment of the present disclosure, there may be basically two types of the graphics instructions of the virtual machine: a three-dimensional graphics instruction and a two-dimensional graphics instruction.

Preferably, the instruction queue unit 502 may further be configured to: if the graphics instruction of the virtual machine is the two-dimensional graphics instruction, send a graphics update instruction to the primary surface management unit 504, where the graphics update instruction may carry the two-dimensional graphics instruction and the first graphics update area.

In this embodiment of the present disclosure, the instruction queue unit 502 may maintain an instruction queue. Every time the instruction queue unit 502 receives an instruction, the instruction queue unit 502 may place the instruction in the instruction queue in order. The instruction queue unit 502 may use a first-in first-out rule, an instruction that is received first may leave the queue first. After the graphics instruction of the virtual machine is received, the graphics instruction of the virtual machine may be placed in the instruction queue, and subsequently a type of the graphics instruction of the virtual machine may be determined.

Because in this embodiment of the present disclosure, the instruction queue unit 502 may maintain the instruction queue, preferably, the instruction queue unit 502 may further be configured to: acquire multiple graphics instructions of the virtual machine, and place the multiple graphics instructions of the virtual machine in an instruction queue to perform subsequent processing one by one.

Preferably, the instruction queue unit 502 may further be configured to: determine whether an execution result of the graphics instruction of the virtual machine changes an image of a primary surface of the virtual machine, and if the execution result of the graphics instruction of the virtual machine changes an image of a primary surface of the virtual machine, allocate an execution sequence number to the graphics instruction of the virtual machine, so that the execution sequence number is carried in the graphics update instruction and is sent to the primary surface management unit, where the execution sequence number is allocated in ascending order or in descending order according to a time sequence of each graphics instruction, of the virtual machine, in the instruction queue.

If the graphics instruction of the virtual machine is the three-dimensional graphics instruction and if the instruction queue unit has allocated an execution sequence number to the graphics instruction of the virtual machine, after the graphics processing unit 304 generates a rendering image according to the graphics instruction of the virtual machine, the rendering image may still continue to carry the execution sequence number. Therefore, after obtaining the rendering image, the primary surface management unit may synthesize a new primary surface according to the execution sequence number carried in the rendering image.

If the graphics instruction of the virtual machine is the two-dimensional graphics instruction and if the instruction queue unit has allocated an execution sequence number to the graphics instruction of the virtual machine, the instruction queue unit may directly send the graphics update instruction to the primary surface management unit according to the two-dimensional graphics instruction, where the graphics update instruction may continue to carry the execution sequence number. Therefore, after obtaining the graphics update instruction, the primary surface management unit may synthesize a new primary surface according to the execution sequence number carried in the graphics update instruction.

Preferably, the instruction queue unit 502 may further be configured to: when the drawing instruction is sent to the graphics processing unit 304, add a graphics moving identifier to the drawing instruction. The drawing instruction sent by the instruction queue unit 502 to the graphics processing unit 304 may further include the graphics moving identifier.

In this embodiment of the present disclosure, if one graphics instruction of the virtual machine carries the graphics moving identifier and if the graphics processing unit 304 receives the graphics instruction of the virtual machine, after obtaining the rendering image according to the graphics instruction of the virtual machine, the graphics processing unit 304 may send, to the image update system, all rendering images that are generated after the graphics processing unit 304 is started or after a previous graphics instruction, carrying the graphics moving instruction, of the virtual machine is executed and before processing of this graphics instruction of the virtual machine is completed, and the graphics processing unit 304 may send all the rendering images to the three-dimensional rendering unit 503. A task of the graphics moving identifier is to obtain, from the graphics processing unit 304, all rendering images that are generated before the graphics processing unit 304 obtains the graphics moving identifier.

In this embodiment of the present disclosure, the graphics processing unit 304 may also send a rendering image to the image update system every time the graphics processing unit 304 generates a rendering image; however, this manner is relatively time-consuming. Therefore, a manner of adding the graphics moving identifier to the graphics instruction of the virtual machine may be used. For example, the graphics moving identifier may be periodically added to the graphics instruction, of the virtual machine, in the instruction queue. After receiving the graphics moving identifier, the graphics processing unit 304 sends rendering images to the image update system in batches. In this way, a total time required for transmission of the rendering images in batches is less than a total time required for transmission of rendering images one by one, so that time may be saved, and operation efficiency is improved.

The three-dimensional rendering unit 503 may be configured to acquire a rendering image corresponding to the graphics instruction of the virtual machine, and send a graphics update instruction to the primary surface management unit, where the graphics update instruction carries the rendering image and the first graphics update area.

Preferably, in this embodiment of the present disclosure, if the graphics instruction of the virtual machine is the three-dimensional graphics instruction, the instruction queue unit 502 needs to send the graphics instruction of the virtual machine to the graphics processing unit 304 for processing, where the instruction queue unit 502 may first send the graphics instruction of the virtual machine to the three-dimensional rendering unit 503, and if the three-dimensional rendering unit 503 determines that a format of the graphics instruction of the virtual machine is not a format that can be recognized by the graphics processing unit 304, the three-dimensional rendering unit 503 may convert the format of the graphics instruction of the virtual machine into a format that can be recognized by the graphics processing unit 304 and then send the graphics instruction to the graphics processing unit 304 for processing, so as to obtain, from the graphics processing unit 304, the rendering image corresponding to the graphics instruction of the virtual machine.

After obtaining the rendering image, the graphics processing unit 304 may transmit the rendering image to the three-dimensional rendering module 503, and the three-dimensional rendering module 503 may generate the graphics update instruction according to the rendering image, and send the graphics update instruction to the primary surface management module 504, where the graphics update instruction may carry the rendering image and the first graphics update area.

Preferably, the three-dimensional rendering unit 503 may further be configured to acquire the rendering image that is sent by the graphics processing unit according to the graphics moving identifier and corresponds to the graphics instruction of the virtual machine.

The primary surface management unit 504 may be configured to acquire an original primary surface of the virtual machine, and synthesize a new primary surface according to the original primary surface of the virtual machine, the first graphics update area, and the rendering image.

Preferably, the primary surface management unit 504 may further be configured to acquire an original primary surface of the virtual machine, and synthesize a new primary surface according to the original primary surface of the virtual machine, the first graphics update area, and the two-dimensional graphics instruction.

Preferably, the primary surface management unit 504 may further be configured to: after the graphics update instruction is received, synthesize the new primary surface corresponding to the graphics update instruction according to the execution sequence number carried in the graphics update instruction.

Preferably, the primary surface management unit 504 may be further configured to acquire a first execution sequence number that is for execution of the synthesizing, by the primary surface management unit 504, a new primary surface at a previous time, and if a time sequence of the execution sequence number, carried in the graphics update instruction, in the instruction queue is not earlier than a time sequence of the first execution sequence number, synthesize the new primary surface corresponding to the graphics update instruction according to the first graphics update area, or if a time sequence of the execution sequence number, carried in the graphics update instruction, in the instruction queue is earlier than a time sequence of the first execution sequence number, modify the first graphics update area, and synthesize the new primary surface corresponding to the graphics update instruction according to the modified first graphics update area.

The sending unit 505 may be configured to send an image corresponding to the new primary surface send to a client 303 of the virtual machine 301.

Embodiment 3

Figure 6:
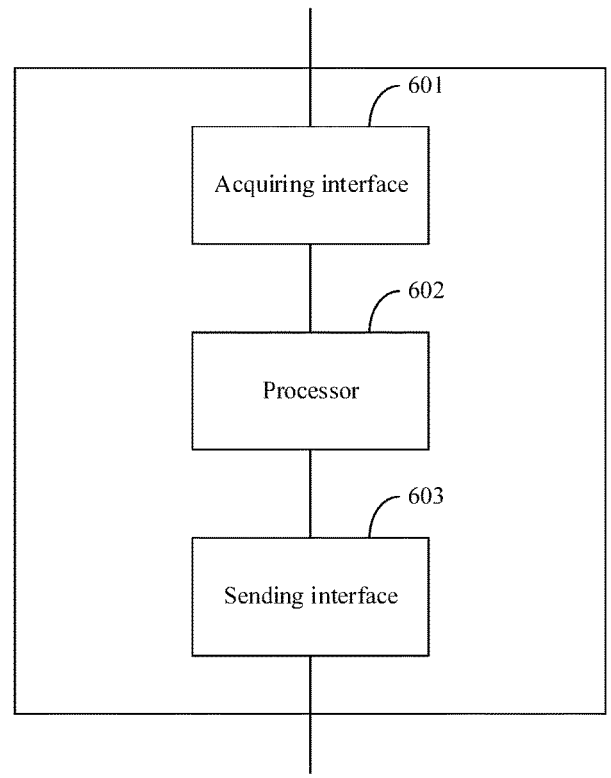
FIG. 6 is a structural diagram of an image update apparatus according to an embodiment of the present disclosure.

Referring to FIG. 6, an embodiment of the present disclosure provides an image update apparatus. The apparatus may include an acquiring interface 601, a processor 602, and a sending interface 603. Preferably, the apparatus may be located in the render server 302 in Embodiment 1, or preferably, the apparatus may be located in the graphics rendering module 3012 in the render server 302, or preferably, the apparatus may be the graphics rendering module 3012 in the render server 302.

The acquiring interface 601 may be configured to acquire a graphics instruction of a virtual machine, where the graphics instruction of the virtual machine carries a first graphics update area and graphics update content.

The processor 602 may be configured to determine a type of the graphics instruction of the virtual machine, and if the type of the graphics instruction of the virtual machine is a three-dimensional graphics instruction, send a drawing instruction to a graphics processing unit 304 to perform rendering processing, where the drawing instruction carries the three-dimensional graphics instruction; acquire a rendering image corresponding to the graphics instruction of the virtual machine, and send a graphics update instruction to a primary surface management unit of the processor 602, where the graphics update instruction carries the rendering image and the first graphics update area; and acquire an original primary surface of the virtual machine, and synthesize a new primary surface according to the original primary surface of the virtual machine, the first graphics update area, and the rendering image.

The processor 602 may be further configured to: if the graphics instruction of the virtual machine is a two-dimensional graphics instruction, send a graphics update instruction to the primary surface management unit, where the graphics update instruction carries the two-dimensional graphics instruction and the first graphics update area; and acquire an original primary surface of the virtual machine, and synthesize a new primary surface according to the original primary surface of the virtual machine, the first graphics update area, and the two-dimensional graphics instruction.

The processor 602 may further be configured to acquire multiple graphics instructions of the virtual machine, and place the multiple graphics instructions of the virtual machine in an instruction queue to perform subsequent processing one by one.

The processor 602 may further be configured to determine whether an execution result of the graphics instruction of the virtual machine changes an image of a primary surface of the virtual machine 301, and if the execution result of the graphics instruction of the virtual machine changes an image of a primary surface of the virtual machine, allocate an execution sequence number to the graphics instruction of the virtual machine, so that the execution sequence number is carried in the graphics update instruction and is sent to the primary surface management unit, where the execution sequence number is allocated in ascending order or in descending order according to a time sequence of each graphics instruction, of the virtual machine, in the instruction queue; and, after the graphics update instruction is received, synthesize the new primary surface corresponding to the graphics update instruction according to the execution sequence number carried in the graphics update instruction.

The processor 602 may be further configured to acquire a first execution sequence number that is for execution of the synthesizing, by the processor 602, a new primary surface at a previous time, and if a time sequence of the execution sequence number, carried in the graphics update instruction, in the instruction queue is not earlier than a time sequence of the first execution sequence number, synthesize the new primary surface corresponding to the graphics update instruction according to the first graphics update area, or if a time sequence of the execution sequence number, carried in the graphics update instruction, in the instruction queue is earlier than a time sequence of the first execution sequence number, modify the first graphics update area, and synthesize the new primary surface corresponding to the graphics update instruction according to the modified first graphics update area.

The processor 602 may be further configured to add a graphics moving identifier to the drawing instruction sent by the graphics processing unit 304, the drawing instruction sent by the processor 602 to the graphics processing unit 304 may carry the graphics moving identifier.

The processor 602 may further be configured to acquire the rendering image that is sent by the graphics processing unit 304 according to the graphics moving identifier and corresponds to the graphics instruction of the virtual machine.

The sending interface 603 may be configured to send the image corresponding to the new primary surface to a client 303 of the virtual machine 304. In this way, the client 303 updates an image of a current primary surface of the client according to the received image corresponding to the new primary surface.

Preferably, the image update system in Embodiment 3 and the image update apparatus in Embodiment 2 may be a same device.

For example, the acquiring unit 501 may be equivalent to the acquiring interface 601.

The instruction queue unit 502, the three-dimensional rendering unit 503, and the primary surface management unit 504 may be located in the processor 602.

The sending unit 505 may be equivalent to the sending interface 603.

The image update method in this embodiment of the present disclosure may include: acquiring, by a render server 302, a graphics instruction of a virtual machine, where the graphics instruction of the virtual machine carries a first graphics update area and graphics update content; determining, by the render server 302, a type of the graphics instruction of the virtual machine; if the type of the graphics instruction of the virtual machine is a three-dimensional graphics instruction, sending, by the render server 302, a drawing instruction to a graphics processing unit 304 to perform rendering processing, where the drawing instruction carries the three-dimensional graphics instruction, acquiring a rendering image corresponding to the graphics instruction of the virtual machine, and sending a graphics update instruction to a primary surface management unit 502 of the render server 302, where the graphics update instruction carries the rendering image and the first graphics update area; and acquiring, by the primary surface management unit 502, an original primary surface of the virtual machine 301, synthesizing a new primary surface according to the original primary surface of the virtual machine 301, the first graphics update area, and the rendering image, and sending an image corresponding to the new primary surface to a client 303 of the virtual machine 301.

In this embodiment of the present disclosure, after the graphics instruction of the virtual machine is obtained, first a type of the graphics instruction of the virtual machine needs to be determined, and manners of processing a three-dimensional graphics instruction and a two-dimensional graphics instruction are different, where the three-dimensional graphics instruction may be sent to the graphics processing unit 304 for processing, and the two-dimensional graphics instruction does not need to be sent to the graphics processing unit 304 and instead may be directly sent to the primary surface management unit 502 for direct processing. In this way, it is not necessary to process all instructions in an image capture manner in the prior art, so that there is no need to concern about an overlapping problem that may occur between windows, and moreover, a two-dimensional graphics instruction does not need to be packaged into a three-dimensional graphics instruction for subsequent processing; obviously, a processing manner is relatively simple, and efficiency of acquiring an image is also improved.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a universal serial bus (USB) flash drive, a removable hard disk, a read-only memory (ROM), a random-access memory (RAM), a magnetic disk, or an optical disc.

As discussed above, the foregoing embodiments are only used to describe the technical solutions of the present application in detail. However, the description of the foregoing embodiments is only used to help to understand the method of the present disclosure and the core concept thereof, and should not be construed as a limitation to the present disclosure. Any variation or replacement readily figured out by a person skilled in the art within the technical scope disclosed in the present disclosure shall fall within the protection scope of the present disclosure.

What is claimed is:

1. An image update method performed by a render server, the method comprising:
  acquiring multiple graphics instructions of a virtual machine;
  placing the multiple graphics instructions in an instruction queue to perform subsequent processing in a sequential manner, wherein a first graphics instruction in the multiple graphics instructions carries a first graphics update area and graphics update content;
  determining a type of the first graphics instruction is a two-dimensional graphics instruction;
  determining whether an execution result of the first graphics instruction changes an image of a primary surface of the virtual machine;
  allocating an execution sequence number to the first graphics instruction when the execution result of the first graphics instruction changes the image, wherein the first graphics update instruction carries the execution sequence number, and wherein the execution sequence number is allocated according to a time sequence of each of the multiple graphics instructions in a sequential order;
  generating a graphics update instruction according to the first graphics instruction without sending the first graphics instruction to a graphics processing unit (GPU) for rendering, wherein the graphics update instruction carries the first graphics instruction and the first graphics update area;
  acquiring, in response to the graphics update instruction, an original primary surface of the virtual machine;
  synthesizing a new primary surface corresponding to the graphics update instruction according to the original primary surface, the first graphics update area, the execution sequence number, and the first graphics instruction; and
  sending an image corresponding to the new primary surface to a client of the virtual machine.

2. The method of claim 1, wherein synthesizing the new primary surface further according to the execution sequence number comprises:
acquiring a first execution sequence number for execution of synthesizing the new primary surface at a previous time; and
synthesizing the new primary surface according to the first graphics update area in response to a first time sequence of the execution sequence number being later than a second time sequence of the first execution sequence number.

3. The method of claim 1, wherein synthesizing the new primary surface further according to the execution sequence number comprises:
acquiring a first execution sequence number for execution of synthesizing the new primary surface at a previous time;
modifying the first graphics update area when a first time sequence of the execution sequence number carried in the graphics update instruction is earlier than a second time sequence of the first execution sequence number; and
synthesizing the new primary surface according to the modified first graphics update area.

4. An image update apparatus comprising:
an acquiring interface configured to acquire multiple graphics instructions of a virtual machine and place the multiple graphics instructions in an instruction queue to perform subsequent processing in a sequential manner, wherein a first graphics instruction in the multiple graphics instructions carries a first graphics update area and graphics update content;
a processor coupled to the acquiring interface and configured to:
determine a type of the first graphics instruction is a two-dimensional graphics instruction;
determine whether an execution result of the first graphics instruction changes an image of a primary surface of the virtual machine;
allocate an execution sequence number to the first graphics instruction when the execution result of the first graphics instruction changes the image, wherein the execution sequence number is allocated according to a time sequence of each of the multiple graphics instructions in a sequential order;
acquire an original primary surface of the virtual machine and a graphics update instruction carrying the first graphics instruction, the execution sequence number, and the first graphics update area; and
synthesize, in response to the graphics update instruction, a new primary surface corresponding to the graphics update instruction according to the original primary surface, the first graphics update area, the execution sequence number, and the first graphics instruction; and
a sending interface coupled to the processor and configured to send an image corresponding to the new primary surface to a client of the virtual machine.

5. The apparatus of claim 4, wherein the processor is further configured to:
acquire a first execution sequence number for execution of synthesizing the new primary surface at a previous time; and
synthesize the new primary surface according to the first graphics update area in response to a first time sequence of the execution sequence number being later than a second time sequence of the first execution sequence number.

6. The apparatus of claim 4, wherein the processor is further configured to:
acquire a first execution sequence number for execution of synthesizing the new primary surface at a previous time;
modify the first graphics update area when a first time sequence of the execution sequence number carried in the graphics update instruction is earlier than a second time sequence of the first execution sequence number; and
synthesize the new primary surface according to the modified first graphics update area.

7. A non-transitory storage medium configured to store image update instructions that when executed by a processor of a render server causes the processor to:
acquire multiple graphics instructions of a virtual machine and place the multiple graphics instructions in an instruction queue to perform subsequent processing in a sequential manner, wherein a first graphics instruction in the multiple graphics instructions carries a first graphics update area and graphics update content;
determine a type of the first graphics instruction of the virtual machine is a two-dimensional graphics instruction;
determine an execution result of the first graphics instruction changes an image of a primary surface of the virtual machine;
allocate an execution sequence number to the first graphics instruction, wherein the execution sequence number is allocated according to a time sequence of each of the multiple graphics instructions in a sequential order;
acquire an original primary surface of the virtual machine and a graphics update instruction carrying the first graphics instruction, the execution sequence number, and the first graphics update area;
synthesize, in response to the graphics update instruction, a new primary surface corresponding to the graphics update instruction according to the original primary surface, the first graphics update area, the execution sequence number, and the first graphics instruction; and
send an image corresponding to the new primary surface to a client of the virtual machine.

8. The non-transitory storage medium of claim 7, wherein the image update instructions further cause the processor to:
acquire a first execution sequence number for execution of synthesizing the new primary surface at a previous time; and
synthesize the new primary surface according to the first graphics update area in response to a first time sequence of the execution sequence number being later than a second time sequence of the first execution sequence number.

9. The non-transitory storage medium of claim 7, wherein the image update instructions further causes the processor to:
acquire a first execution sequence number for execution of synthesizing the new primary surface at a previous time;
modify the first graphics update area when a first time sequence of the execution sequence number carried in the graphics update instruction is earlier than a second time sequence of the first execution sequence number; and synthesize the new primary surface according to the modified first graphics update area.

* * * * *